July 28, 1931.  J. W. LEA  1,816,120
BUMPER
Filed Feb. 21, 1931   3 Sheets-Sheet 3
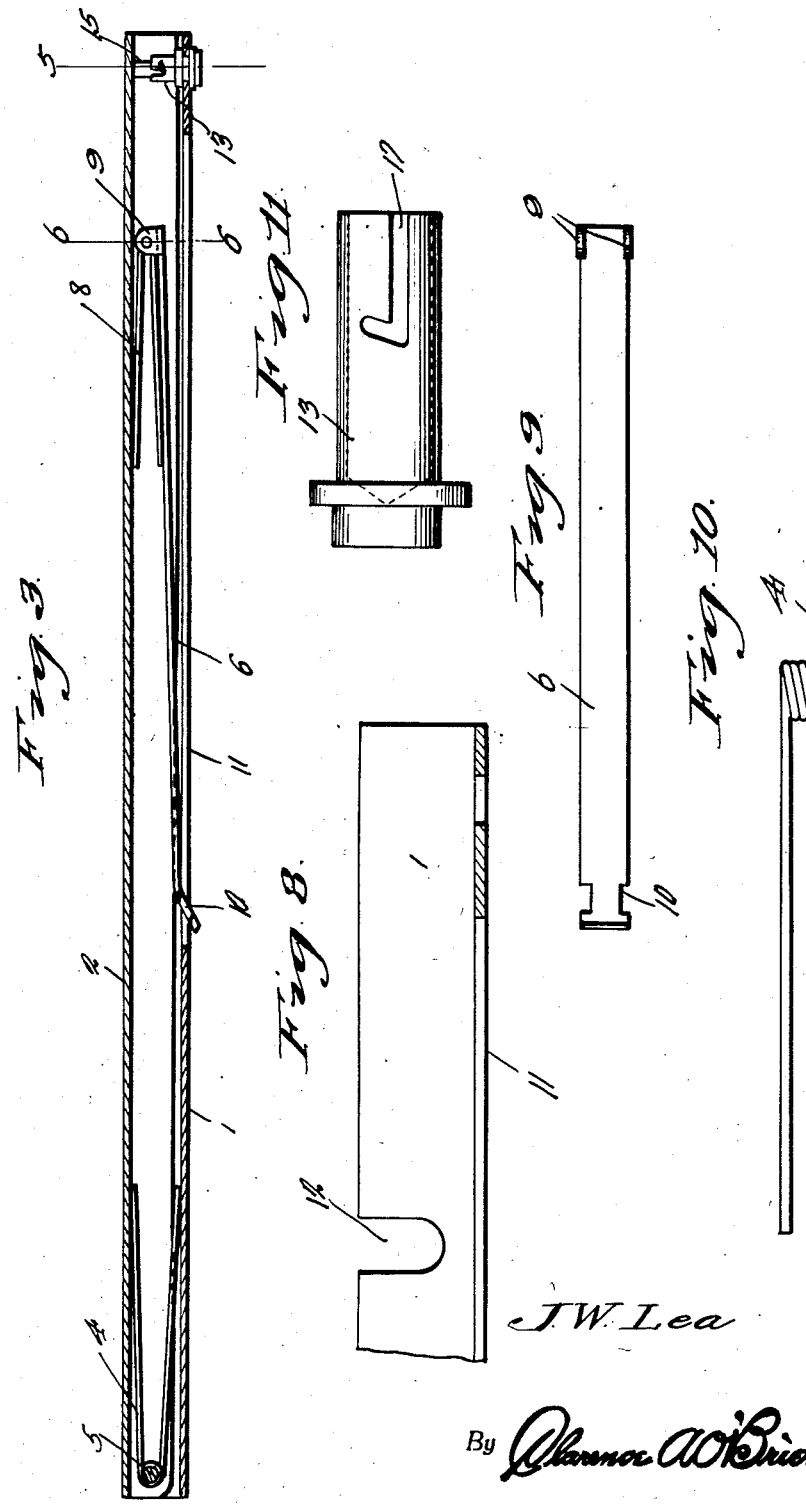
Inventor
J. W. Lea
By Clarence A. O'Brien
Attorney Patented July 28, 1931

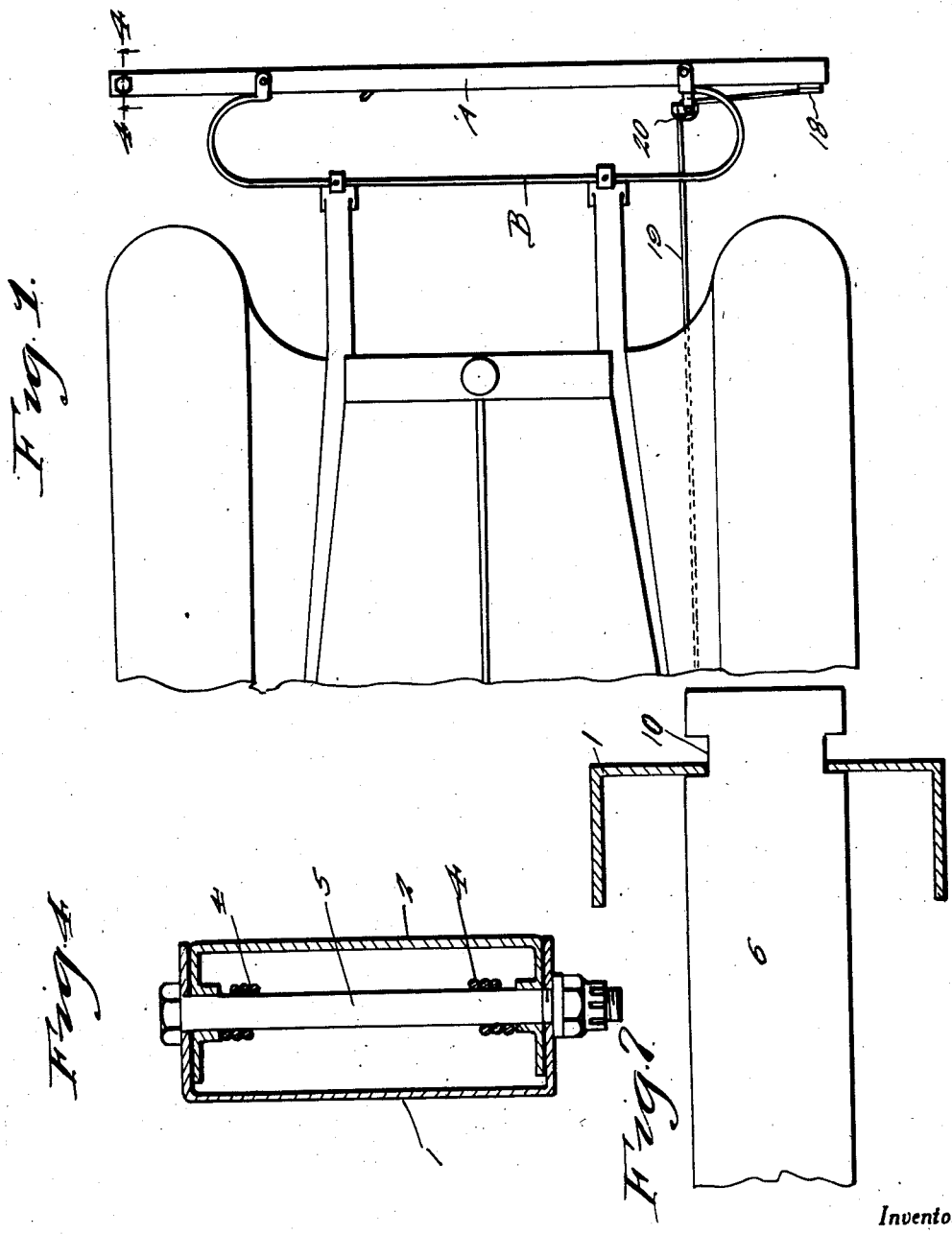
July 28, 1931. J. W. LEA 1,816,120
BUMPER
Filed Feb. 21, 1931   3 Sheets-Sheet 1
Inventor
J. W. Lea
By Clarence A. O'Brien
Attorney

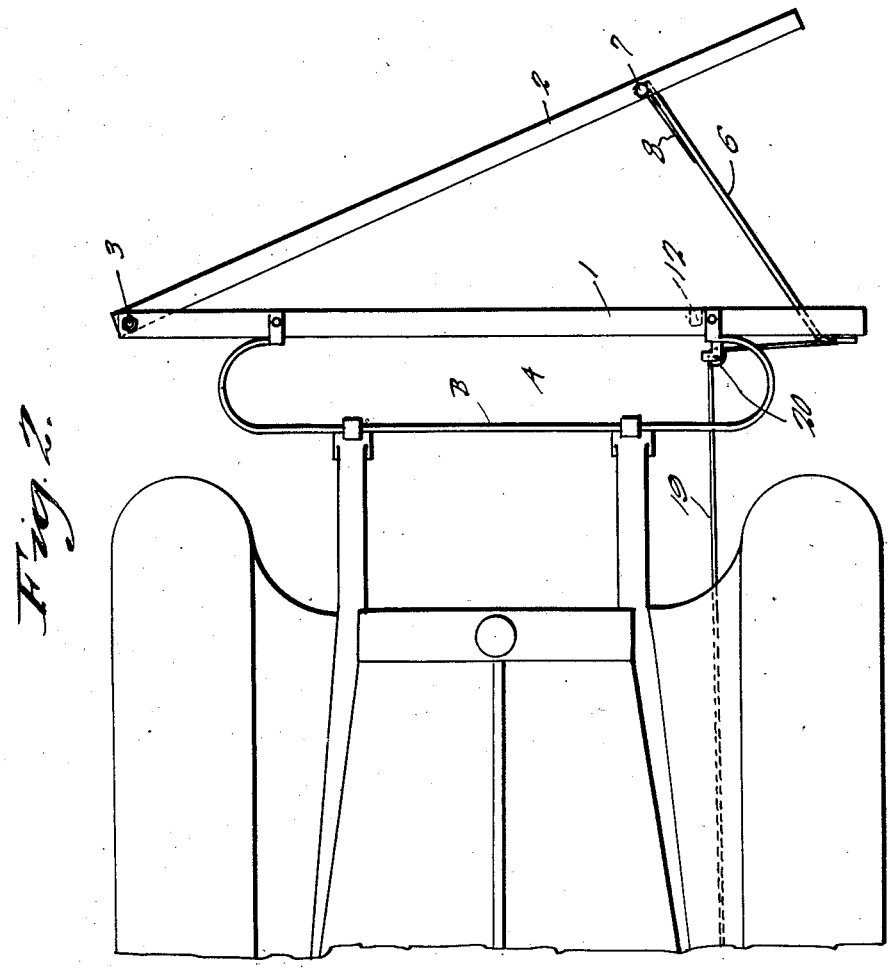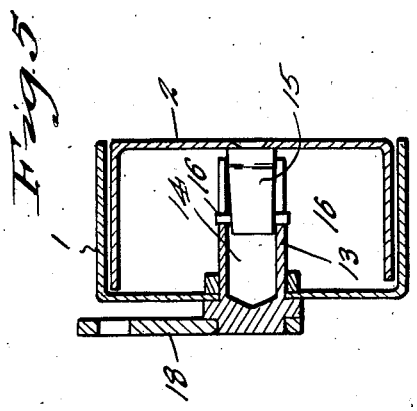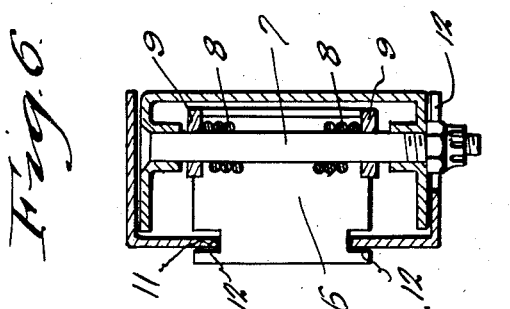

1,816,120

UNITED STATES PATENT OFFICE

JESSE W. LEA, OF JACKSON, LOUISIANA

BUMPER

Application filed February 21, 1931. Serial No. 517,571.

This invention relates to a bumper for use on motor cars, trucks, busses, street cars and the like, and the general object of the invention being to provide means whereby the bumper can be extended to a diagonal position in front of the vehicle whenever desired so as to reduce shock of the vehicle striking an object such as another vehicle, and tending to cause the objects to move out of the path of the car by being deflected by the diagonal arranged bumper, and by extending the bumper there is less liability of the lamps, fenders, radiator and other parts of the vehicle from being damaged as there would be if the bumper remained in the usual transverse position across the front of the car.

Another object of the invention is to enable one to extend the bumper when parking the vehicle so as to prevent any one from parking another vehicle so close to the vehicle to which the invention is attached, to make it impossible or render it difficult for the said vehicle to leave the parking space, for by moving the bumper to its original position, ample space will be left between the two cars for the vehicle equipped with the invention to readily move out of the parking space.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts through out the several views, and in which:—

Figure 1 is a top plan view of the front part of a motor vehicle showing the improved bumper in use with the movable part retracted.

Fig. 2 is a similar view but showing the movable part projected.

Fig. 3 is a horizontal sectional view through the bumper with the parts retracted.

Fig. 4 is a section on the line 4—4 of Fig. 1.

Fig. 5 is a section on the line 5—5 of Fig. 3.

Fig. 6 is a section on the line 6—6 of Fig. 3.

Fig. 7 is a sectional detail view showing how the front end of the pivoted arm engages in the slot in the stationary part of the bumper.

Fig. 8 is a sectional view through a part of the stationary part of the bumper and showing the construction of the right hand end thereof.

Fig. 9 is a view of the pivoted arm or brace member.

Fig. 10 is a view of one of the springs.

Fig. 11 is a view of the latching device.

In these drawings, the letter A indicates the improved bumper which is yieldably supported from the front part of the vehicle in any suitable manner such as by the member B having its ends looped and connected with the bumper. The bumper is composed of the two parts 1 and 2 which are hingedly connected together at one end of said bumper as shown at 3. Each part may be of channel-shape in cross section, as shown in the drawings or of any other suitable shape.

Springs 4 are placed on the pivot bolt 5, and the springs are so arranged as to tend to move the part 2 outwardly from the part 1, it being understood that this part 1 is stationary, as it is connected with the member B. An arm or brace member 6 is pivotally connected to the part 2 of the bumper by the pivotal bolt 7 which passes through the movable part 2 adjacent the free end thereof and springs 8 are carried by the pivotal bolt and tend to move the arm or brace member 6 outwardly. Each of the springs 4 and 8 is preferably of the type shown in Fig. 10, which illustrates one of the springs 4.

The arm or brace member preferably is formed of a flat piece of metal or other suitable material having the ears 9 at one end thereof which are perforated to receive the bolt 7 and its other end is slightly bent and formed with the notches 10 in its edges. These notches receive the walls of slot 11 in the bight of the stationary part 1, said slot terminating short of the right hand end of the stationary part 1. As shown in Fig. 6 the bolt 7 is provided with a flat head which is counter-sunk in a wall of the movable part 2, and the stationary part has a notch 12 therein for receiving the other end of the bolt and the nut thereon when the movable part is resting in the stationary part, as shown in Fig. 6.

A rotatable latch member 13 is carried by the stationary part 1 and has a socket 14 therein for receiving a stud 15 on the movable member 2, said stud having projections 16 thereon for engaging bayonet slots 17 in the member 13 for holding the movable part 2 in the stationary part 1.

The head of the member 13 is formed with an arm 18 to which is attached a cable 19 leading to a point adjacent the driver's seat, and passing over suitable guiding pulleys, one of which is shown at 20. It will be seen from Fig. 5, the arm 18 extends vertically the pulley 20 is so arranged that that part of the cable between the pulley and the arm will extend substantially horizontally so that when the cable is pulled upon the resultant movement of the arm 18 will produce a partial rotation of the member 13 so as to place a straight portion of each slot 17 in alinement with the pin 16 so that the pin can be drawn through the slots 17 as the member 2 is swung outwardly by its spring.

From the foregoing, it will be seen that the member 2 is normally located within the member 1 and is held therein by the projections 16 on the member 15 engaging the angular ends of the slots 17 in the member 13. Then when it is desired to project the movable part 2, the cable is pulled open so as to partially rotate the member 14 whereby the straight parts of the slots 17 will be aligned with the projections 16, so that the springs will force the member 2 outwardly and as said member 2 moves outwardly, the spring 8 will cause the arm 6 to swing in an arc of a circle from a position partly within the member 2 to the position it occupies in Fig. 2.

During this movement, the notched parts 10 of the arm ride over the walls of the slot 11 in the stationary part 1. The arm then acts as a brace for holding the movable member 2 in a diagonal position across the front of the vehicle so that if the vehicle strikes another vehicle, or any other object, the shock of the blow is greatly reduced by the slanting position of the part 2 of the bumper, and this position of the bumper also causes the other vehicle or object to tend to move to one side of the vehicle which carries the improved bumper.

The extended part 2 of the bumper also acts to prevent damage to the lamps, fenders and radiator, and other parts at the front of the vehicle, due to the fact that said extending part 2 prevents the other vehicle or object from getting close enough to said parts to damage the same.

As before stated, when the vehicle is to be parked, the part 2 can be extended and thus it will be impossible for another vehicle to park close enough to the first vehicle to render it impossible for the first vehicle to leave the parking space for when the driver of the first vehicle wishes to leave the space, it is simply necessary for him to move the part 2 back into the part 1 and this provides plenty of room to leave the parking space.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A bumper of the class described comprising a stationary part, a movable part hinged at one end to one end of the stationary part and means for moving the movable part outwardly to a diagonal position when desired.

2. In combination with a vehicle, a bumper therefor, and means for moving the bumper to a diagonal position at the front of the vehicle when desired.

3. A bumper of the class described comprising a stationary part, a movable part, means for hinging one end of the movable part to one end of the stationary part, an arm hingedly connected to one of the parts and slidably engaging a portion of the other part, and means for moving said arm to a bracing position when the movable part of the bumper is moved outwardly, whereby the arm will hold said movable part in a diagonal position.

4. A bumper of the class described comprising a stationary part, and a movable part pivotally connected thereto at one end, a brace arm hingedly connected to the movable part, said stationary part having an elongated slot therein terminating short of one end of the said part, and a brace arm having a notched part for receiving the walls of the slot whereby the free end of the brace arm is slidably connected with the stationary part, and spring means for swinging the arm to bracing position.

5. A bumper of the class described comprising a stationary part and a movable part, pivotally connected together at one end, each part being of channel-shape with the movable part fitting in the stationary part, spring means for moving the movable part outwardly, a brace arm pivoted to the movable part and slidably engaging a part of the stationary part and a spring for moving the arm to bracing position.

6. A bumper of the class described comprising a stationary part, a movable part, means for pivotally connecting the two parts together at one end thereof, a brace arm pivotally connected with one of the parts and slidably engaging the other part, means for moving the arm to bracing position, a lock for normally holding the movable part against the stationary part, and means for releasing the lock from a distant point.

7. A bumper of the class described comprising a stationary part, a movable part pivotally connected at one end to one end of the stationary part, means for normally holding the movable part projected from the stationary part, a brace arm pivotally connected with the movable part, the free end of the arm being notched and the stationary part having a slot therein for receiving the notched part, a spring for normally holding the brace arm at the outer end of the slot, whereby said brace arm will hold the movable part in a diagonal position, a rotary tubular member in one end of the stationary part, a projection on the movable part adapted to enter the tubular part when the two parts of the bumper are in engagement with each other, said tubular part having bayonet slots therein and the projection having small projections thereon for engaging the bayonet slots, and means for partly rotating the tubular part from a point adjacent the driver's seat, whereby the movable part of the bumper will be released from the stationary part thereof.

8. A bumper of the class described comprising a stationary part, a movable part pivoted at one end to one end of the stationary part, spring means for normally holding the movable part in projected position, a brace arm pivoted at one end to the movable part and having its other end notched, a slot in the stationary part terminating short of one end of said part, the notched part of the arm fitting in said slot, a spring for normally holding the arm in bracing position with the movable part of the bumper in a diagonal position, means for locking the movable part in a position adjacent the stationary part, and means for releasing the latter means from a point adjacent the driver's seat.

In testimony whereof I affix my signature.

JESSE W. LEA.